July 1, 1930.  Y. KIKUCHI  1,768,850
GEAR TRANSMISSION
Filed June 17, 1927
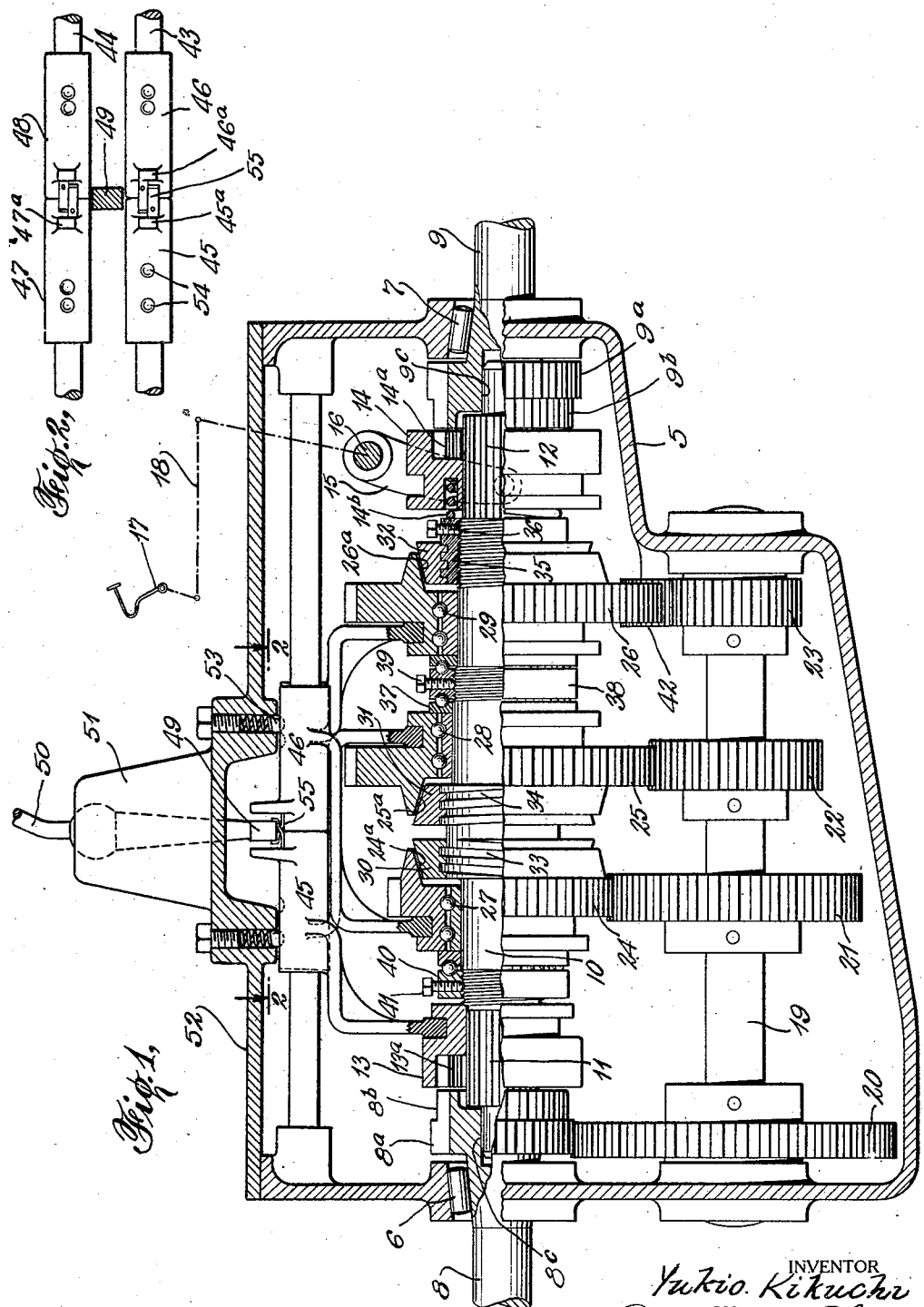
INVENTOR
Yukio Kikuchi
BY
ATTORNEY Patented July 1, 1930

1,768,850

UNITED STATES PATENT OFFICE

YUKIO KIKUCHI, OF MONTCLAIR, NEW JERSEY

GEAR TRANSMISSION

Application filed June 17, 1927. Serial No. 199,536.

This invention relates to a gear transmission for use in transmitting the power of a motor or other shaft to the shaft or shafts to be driven, such for example, as a gear transmission for motor vehicles interposed between the engine shaft and the rear axle or driving shaft or shafts; and the object of the invention is to provide a gear wherein the several speed gears, that is to say, first, second and third, as well as reverse gears are constantly retained in mesh in the operation of the transmission gearing, with means movably disposed on the transmission gear shaft for placing separately, the various speed and drive gearings in operative connection therewith, said means involving a series of clutches with means for actuating the same; a further object being to provide means for automatically tightening the clutch member or members mounted on the transmission drive shaft in the engagement of the movable clutches therewith; a still further object being to provide, as a part of the transmission mechanism, a clutch for coupling and uncoupling the engine shaft to be driven, thus eliminating the use of the usual clutch interposed between the transmission and engine; and with these and other objects in view, the invention consists in an apparatus of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a longitudinal, sectional view through a transmission made according to my invention, part of the construction being open in section and in full lines; and, Fig. 2 is a detail, plan view of a part of the construction shown in Fig. 1.

In the drawing, 5 represents the transmission casing or housing in which my improved transmission gearing is mounted, said housing being provided at opposite ends with roller bearings 6 and 7 arranged in axial alinement and for supporting the shafts or stub shafts 8 and 9 respectively. The shaft 8 represents the member to be coupled with the engine or other power source, and the shaft 9, the member to be coupled with the driven shaft or shafts, directly or indirectly. In the use of the apparatus in motor vehicles, it will be understood that the shaft 9 is in operative connection with the differential mechanism in the rear axle housing, and thus coupled with the drive wheels of the vehicle.

The shaft 8, has within the casing 5, an enlarged body having an external gear face $8^a$ and a clutch element $8^b$ and an aperture $8^c$ forming a bearing for one end of a transmission shaft 10. In a like manner, the shaft 9 has within the casing 5, two external gear faces $9^a$ and $9^b$ and an aperture $9^c$ forming a bearing for the other end of the shaft 10.

The end portions of the shaft 10 are provided with clutch members 11 and 12, on which are slidably mounted, clutches 13 and 14 respectively. The clutch 13 has an internal clutch element $13^a$ adapted to mesh with the clutch element $8^b$, and the clutch 14 has a similar internal clutch element $14^a$ adapted to mesh with the gear $9^b$. In the direct, third or high speed drive, the clutches 13 and 14 are in mesh with the clutch element $8^b$ and gear $9^b$ respectively, providing a direct coupling of the shaft 10 with the shafts 8 and 9 as will be understood. The clutch 14 is normally held in engagement with the gear $9^b$ by a spring $14^b$ and is moved out of engagement therewith by a lever 15 pivoted as seen at 16, and which is actuated through a foot pedal or other control 17 through a link 18, diagrammatically illustrated in Fig. 1 of the drawing. The pedal 17 functions as a clutch pedal of a motor vehicle or any other control may be used. Mounted in the casing 5 below the shaft 10 is a supplemental shaft 19 to which is secured four gears 20, 21, 22 and 23. The gear 20 meshes at all times with the gear $8^a$, while the gears 21, 22 and 23 mesh with clutch members or gear faces on clutch members 24, 25 and 26 respectively.

The members 24, 25 and 26 are freely rotatable on bearings 27, 28 and 29 mounted on and slidable longitudinally of the shaft 10 to a slight degree sufficient to bring the beveled clutch faces 24ª, 25ª and 26ª thereof in engagement with the peripherial faces of conical clutches 30, 31 and 32 respectively. The clutches 30 and 31 are mounted upon and in threaded engagement with wide threaded portions 33 and 34 on the shaft 10, the threads of which are arranged or pitched in opposite directions in such manner that the rotation of the clutch gear 24 when moved into engagement with the clutch 30 will cause said clutch to turn on the threads 33, and thus move in the direction of the member 24 to securely couple the parts 24 and 30 together, and cause the shaft 10 to be driven. In a like manner, the movement of the gear clutch 25 into engagement with the clutch 31 will cause the clutch 31 to move to the right into firm engagement with the clutch face 25. This construction prevents any possible slippage between the parts 24—30, 25—31, and also 26—32. In the latter case, the clutch 32 is mounted upon a collar 35 threaded in like manner to the threads 33 on the shaft 10, the collar being fixed to the shaft by threaded engagement therewith as clearly seen, and retained in position by a set screw 36.

Interposed between the clutch members 25 and 26 is a double thrust bearing 37, the central collar 38 of which is in threaded engagement with the shaft 10 and fixed in position by a set screw 39. Another thrust bearing 40 is arranged on the shaft 10 outwardly of and to the left of the member 24 and is in threaded engagement with the shaft and held in position by the set screw 41.

A clutch gear 26 does not mesh directly with the gear 23 but is in operative connection with said gear through an intermediate gear 42 having a bearing in the casing 5, the latter gear construction being employed for the reverse driving or rotation of the shaft 9 for propelling the apparatus or vehicle in a backward direction as is common in motor vehicle transmission apparatus.

From the foregoing, it will be understood that when the shaft 8 is rotated by the operation of the engine or other source of power, the gears 20, 21, 22 and 23 are also rotated, and thus the clutch gears 24, 25 and 26 are correspondingly rotated, all of said gears remaining in mesh in all operations of the transmission apparatus. In Fig. 1 of the drawing, the apparatus is shown in a neutral position; that is to say, the clutch element 13ª is out of engagement with the clutch element 8ᵇ, and the clutches 24, 25 and 26 are out of engagement with the clutches 30, 31 and 32. Also, the clutch 14 is shown in a disengaged position. In starting the vehicle or other apparatus at low or first speed, the clutch 14 is moved into engagement with the gear 9ᵇ and the clutch gear 25 is moved into engagement with the clutch 31. Thus, the shaft 9 will be driven from the shaft 8 through the gears 8ª, 20, 22, 25 and the clutch 31.

In driving at second speed, the clutch gear 25 is moved out of engagement with the clutch 31, and clutch gear 24 is moved into engagement with the clutch 30. This result may be accomplished with or without directing the connection between the clutch 14 and gear 9ᵇ, it being understood that the engine is speeded up sufficiently to prevent a sudden jerking or starting of the higher speed drive as compared with the low or first speed drive. This result may also be effected by a slow shifting of clutch gears to provide a slight slippage in the manner of slipping a clutch. In the high or direct operation of the vehicle or shaft from the second speed to the third speed, the clutch gear 24 is moved out of engagement with the clutch 30, and the clutch 13 is moved into engagement with the clutch element 8ᵇ.

In the above described operations, it will be understood that any suitable means may be employed for actuating the several clutch or clutch gears employed. In the use of my improved apparatus on motor vehicles, it is preferred that a standard type of shifting be employed. In the several shifts for change speed driving, it will be understood that the differential speed of the shaft 10 as compared with the rotation of the respective gears or clutch gears, will cause an unwinding and separation of the clutch gears and clutches, permitting of the free release and movement of the clutch gears 24—25. This is also true in shifting from forward to reverse or vice versa. In the latter case, the combined clutch gears and clutches will act as brakes to retard the action or rotation of the shaft 10, it being apparent that the clutch members 30, 31 and 32 unthread themselves from their firm engagement position to a release and from position with reference to the gear clutch members 24, 25 and 26.

It will also be understood that in shifting from second speed to low speed in order to disengage the clutch 30 from the gear clutch 24, the driving of the power shaft should be suddenly and momentarily stopped to cause the momentum of the driven shaft 10 to move the clutch 30 to the right out of engagement with the gear 24, at the same time moving said gear to the left by the gear shifting means and in the operation of moving the gear 25 into engagement with the clutch 31. In making some shifts, it is necessary to increase or accelerate the power shaft operation and in other cases to suddenly stop such acceleration to allow the momentum of the driven shaft to bring about the disengagement.

In the accompanying drawing, I have shown for the purpose of illustrating one method of actuating the several clutch members employed, two shafts 43 and 44 mounted in the upper end of the casing 5 and arranged in spaced parallel relation. Slidably mounted on said shafts are collars 45, 46, 47 and 48, the collars 45 and 46 being mounted on the shaft 43 and the other two collars on the shaft 44. These collars are provided with upwardly directed fingers 45ª, 46ª, 47ª and 48ª adapted to be engaged by the lower end 49 of a clutch operating lever 50 pivotally supported in a block 51 carried by a plate or cover 52 mounted on the top of the casing 5. The clutch operating lever 50 is of the standard operation type, and in neutral position, the end 49 is positioned intermediate all of the fingers 45ª—48ª.

In moving the lever 50 forwardly and to the left for reverse drive, the end 49 of the lever engages the finger 48ª and moves the collar 48 backwardly as seen in Figs. 1 and 2, thus moving the clutch gear 26 into engagement with the clutch 32. In the backward movement of the lever 50 and to the left, or in other words, in pulling said lever toward the operator, the finger 47ª is engaged and the sleeve 47 is moved forwardly as seen in the drawing, thus moving the clutch gear 25 into engagement with the clutch 31. In moving from first to second and past the neutral position, wherein the lever 50 is moved forwardly and backwardly, the sleeve 46 is moved backwardly, as seen in the drawing, and the clutch gear 24 is moved into engagement with the clutch 30. In like manner, the reverse of the last operation will move the sleeve 45 forwardly as seen in the drawing to move the clutch 13 into engagement with the clutch element 8ᵇ. Any suitable means, such for example as spring pressed balls 53 engaging recesses 54 in the sleeves 45—48 may be employed for retaining said sleeves in their several positions. Spring fingers or other means 55 on the respective sleeves 45—48 may be employed for returning the sleeves 45—48 to neutral position.

It will be understood that my invention is not necessarily limited to any specific means for actuating the several clutches employed, nor is my invention limited to the use of the transmission on motor vehicles or similar types of apparatus, as the same may be employed for transmitting power from a power source to a member or apparatus to be driven of any kind or class. Further, it will be understood that my invention is not limited to any particular arrangement of speeds, or to the number of speeds employed, and various other changes in and modifications of the construction herein shown and described may be made within the scope of the appended claims, without departing from the spirit of my invention or sacrificing its advantages.

Having fully described my invention, what I claim as new and desire to secure by Letters Patent, is:—

1. In a transmission of the class described, a floating main shaft, a supplemental shaft having a plurality of gears arranged and fixed thereto in spaced relation, said supplemental shaft being in direct operative connection with the power shaft, a plurality of gear members mounted in spaced relation on the main shaft and free to rotate thereon and in constant mesh with the gears of the supplemental shaft, and means in screw threaded engagement with the main shaft and toward and from which the gear members on the main shaft are movable in coupling and uncoupling said gear members with respect to the main shaft.

2. In a transmission of the class described, a floating main shaft, a supplemental shaft having a plurality of gears arranged and fixed thereto in spaced relation, said supplemental shaft being in direct operative connection with the power shaft, a plurality of gear members mounted in spaced relation on the main shaft and free to rotate thereon and in constant mesh with the gears of the supplemental shaft, means in screw threaded engagement with the main shaft and toward and from which the gear members on the main shaft are movable in coupling and uncoupling said gear members with respect to the main shaft, and said last named means involving clutch members movable on said screw threads in the direction of said gear members by the frictional engagement of the gear members therewith in firmly coupling the gear members with the main shaft.

3. A transmission comprising a casing, main and supplemental shafts mounted in said casing in spaced and parallel relation, gear members arranged in bearings at opposite sides of the casing, one of said gear members being adapted to be coupled with a power shaft and the other with a shaft to be driven, said main shaft being freely rotatable in said gear members, said supplemental shaft being geared directly in connection with said power driven gear member to provide for a constant driving of the supplemental shaft, transmission gears mounted in spaced relation on the supplemental shaft, combination gear and clutch units disposed on the main shaft and involving gear and clutch elements having cooperating beveled faces, the gear element of each unit being slidably and rotatably mounted on said shaft, and the clutch element thereof being in screw threaded engagement with said shaft, and means involving a gear shifting lever for moving the gear element of each unit in the direction of the clutch element of said units for coupling the respective units with the main shaft.

4. In a transmission of the class described involving main and supplemental shafts, a power shaft in constant operative engagement with the supplemental shaft, and a driven shaft adapted to be coupled with the main shaft and gear unit comprising a gear element slidably and rotatably mounted on the main shaft and in constant mesh with a gear on the supplemental shaft, and a clutch element arranged adjacent said gear element and in screw threaded engagement with said main shaft, said gear and clutch elements having cooperating beveled clutch faces and means for moving the gear element in the direction of the clutch element to firmly engage said clutch element, moving the same on said screw threads in the direction of the gear element in firmly coupling said gear element with the main shaft in the operation of rotating the same.

In testimony that I claim the foregoing as my invention I have signed my name this 16th day of June, 1927.

YUKIO KIKUCHI.